US010038327B2

(12) United States Patent
Kim et al.

(10) Patent No.: US 10,038,327 B2
(45) Date of Patent: Jul. 31, 2018

(54) MOBILE TERMINAL AND BATTERY CHARGING METHOD THEREFOR

(71) Applicant: LG ELECTRONICS INC., Seoul (KR)

(72) Inventors: Sookyoung Kim, Seoul (KR); Byoungyong Hong, Seoul (KR); Jaehwan Park, Seoul (KR); Younghan Kim, Seoul (KR); Sangwoo Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

(21) Appl. No.: 15/022,152

(22) PCT Filed: Mar. 13, 2014

(86) PCT No.: PCT/KR2014/002110
§ 371 (c)(1),
(2) Date: Mar. 15, 2016

(87) PCT Pub. No.: WO2015/037805
PCT Pub. Date: Mar. 19, 2015

(65) Prior Publication Data

US 2016/0241066 A1 Aug. 18, 2016

(30) Foreign Application Priority Data

Sep. 16, 2013 (KR) ........................ 10-2013-0110914

(51) Int. Cl.
*H02J 7/00* (2006.01)
*H04W 52/00* (2009.01)
*H04W 52/02* (2009.01)

(52) U.S. Cl.
CPC ............ *H02J 7/0045* (2013.01); *H02J 7/007* (2013.01); *H02J 7/0027* (2013.01);
(Continued)

(58) Field of Classification Search
CPC ........ H02J 7/0045; H02J 7/0027; H02J 7/007; H02J 7/0081; H02J 2007/0096; H04W 52/0209; Y02B 60/50
(Continued)

(56) References Cited

U.S. PATENT DOCUMENTS 5,241,258 A * 8/1993 Cheon ..................... H02J 7/008
320/137
5,461,262 A * 10/1995 Hirasawa ................ B60R 16/04
307/10.1

(Continued)

FOREIGN PATENT DOCUMENTS

JP 5-137272 A 6/1993
JP 2002078223 A * 3/2002 ................ H02J 7/00

(Continued)

OTHER PUBLICATIONS

Toya et al. (Machine English translation of Japanese Patent Document No. JP-2009-247161A, published Oct. 22, 2009, machine tranlsated via Japan Patent Office website, translated on Oct. 30, 2017, 25 pages).*

(Continued)

*Primary Examiner* — Phallaka Kik
(74) *Attorney, Agent, or Firm* — Birch, Stewart, Kolasch & Birch, LLP

(57) ABSTRACT

A mobile terminal and a battery charging method therefor are provided. The mobile terminal includes: a terminal body including a battery; an adaptor connecter formed at one side surface of the terminal body and to which a power supply adaptor is connected; a plurality of charging units configured to charge the battery between the adaptor connecter and the battery; and a controller configured to generate a control signal for controlling each of the plurality of charging units.

10 Claims, 7 Drawing Sheets

START
S101 USB terminal is connected to adaptor connector? Yes / No
S102 Battery charge Period is any one of first to third periods? Third period / Second period
S103 Charge using only first charging unit
S104 IR02 occurs? No / Yes
S105 First charging unit determines AICL
S106 Calculate charge current of first charging unit and charge current of second charging unit
S107 Charge using both first and second charging units
S108 IR03 occurs? No / Yes
S109 Charge using only first charging unit
S110 IR04 occurs? No / Yes
S111 END
S112 Charge using only first charging unit
S113 IR04 occurs? No / Yes

(52) U.S. Cl.
CPC ....... *H02J 7/0081* (2013.01); *H04W 52/0209* (2013.01); *H02J 2007/0096* (2013.01); *Y02D 70/00* (2018.01); *Y02D 70/1244* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01)

(58) Field of Classification Search
USPC .......................... 320/114, 125, 134, 136, 160
See application file for complete search history.

(56) References Cited

U.S. PATENT DOCUMENTS

| | | | | | |
|---|---|---|---|---|---|
| 5,783,322 | A * | 7/1998 | Nagai | H01M 10/48 | 320/134 |
| 6,204,633 | B1 * | 3/2001 | Kitagawa | H02J 7/0068 | 320/128 |
| 6,777,913 | B2 * | 8/2004 | You | H02J 7/0013 | 320/125 |
| 2004/0008007 | A1 * | 1/2004 | Nagai | H02J 7/0055 | 320/134 |
| 2005/0088141 | A1 * | 4/2005 | Lee | A45F 5/00 | 320/114 |
| 2007/0216355 | A1 * | 9/2007 | Kim | H02J 7/0024 | 320/128 |
| 2008/0036417 | A1 * | 2/2008 | Toya | H02J 7/0013 | 320/101 |
| 2008/0061735 | A1 * | 3/2008 | Toya | H02J 7/0045 | 320/108 |
| 2009/0115374 | A1 * | 5/2009 | Noda | H01M 10/44 | 320/138 |
| 2010/0060230 | A1 * | 3/2010 | Schein | H02J 7/0044 | 320/103 |
| 2010/0188051 | A1 * | 7/2010 | Yamazaki | H02J 7/0072 | 320/148 |
| 2010/0259228 | A1 * | 10/2010 | Chen | H02J 7/0052 | 320/162 |
| 2011/0074339 | A1 * | 3/2011 | Midorikawa | G06F 1/1635 | 320/106 |
| 2013/0082643 | A1 | 4/2013 | Cha | | |

FOREIGN PATENT DOCUMENTS

| | | | | |
|---|---|---|---|---|
| JP | 2009247161 | A * | 10/2009 | H02J 7/00 |
| KR | 10-2006-0032285 | A | 4/2006 | |
| KR | 10-2010-0108129 | A | 10/2010 | |
| KR | 10-2012-0056752 | A | 6/2012 | |
| KR | 10-2013-0036691 | A | 4/2013 | |

OTHER PUBLICATIONS

Kyeongyong (Machine English translation of Japanese Patent Document No. JP-05-137272, published Jun. 1, 1993, machine translated via Japan Patent Office website, translated on Oct. 30, 2017, 19 pages).*

Park (Machine English translation of Korean Patent Document No. KR-10-2012-0056752, published Jun. 4, 2012, machine translated via Korean Patent Office website, translated on Oct. 30, 2017, 22 pages).*

* cited by examiner

【FIGURE 1】
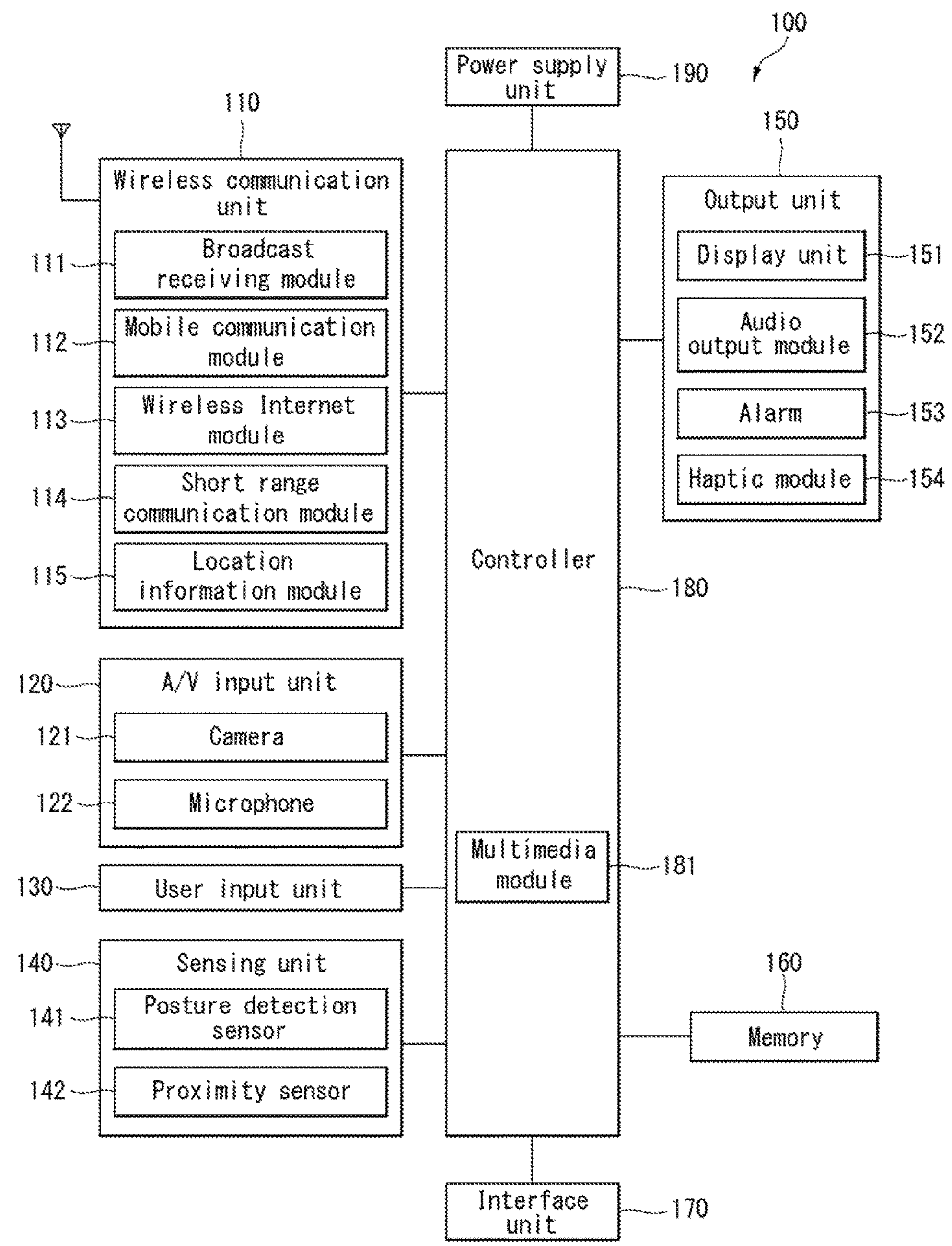

【FIGURE 2】
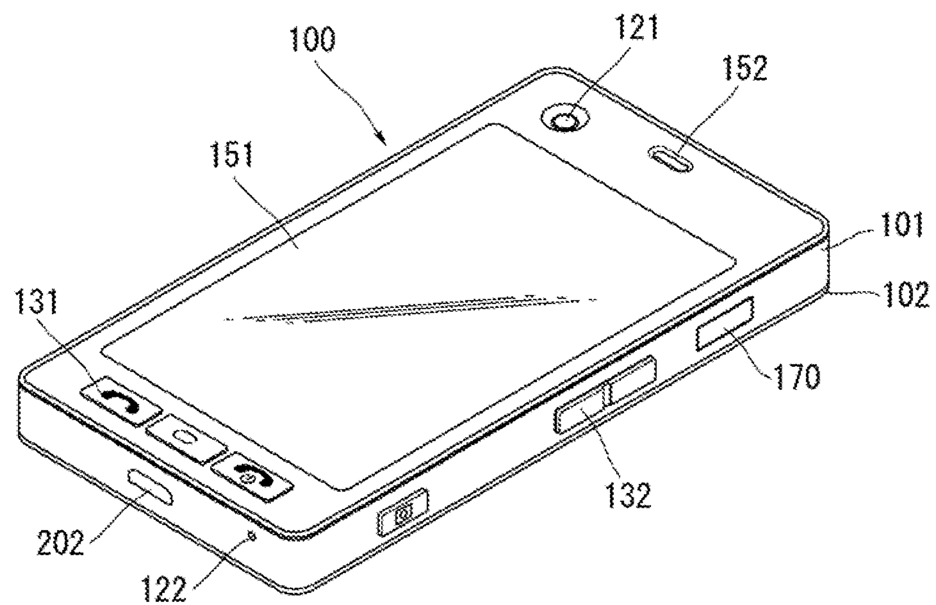
【FIGURE 3】
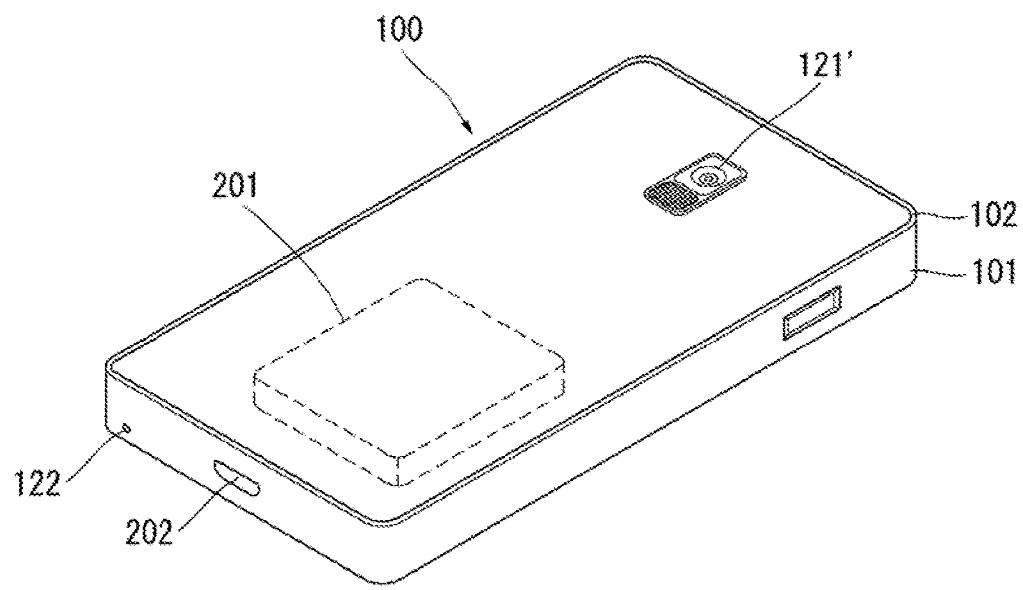

【FIGURE 4】
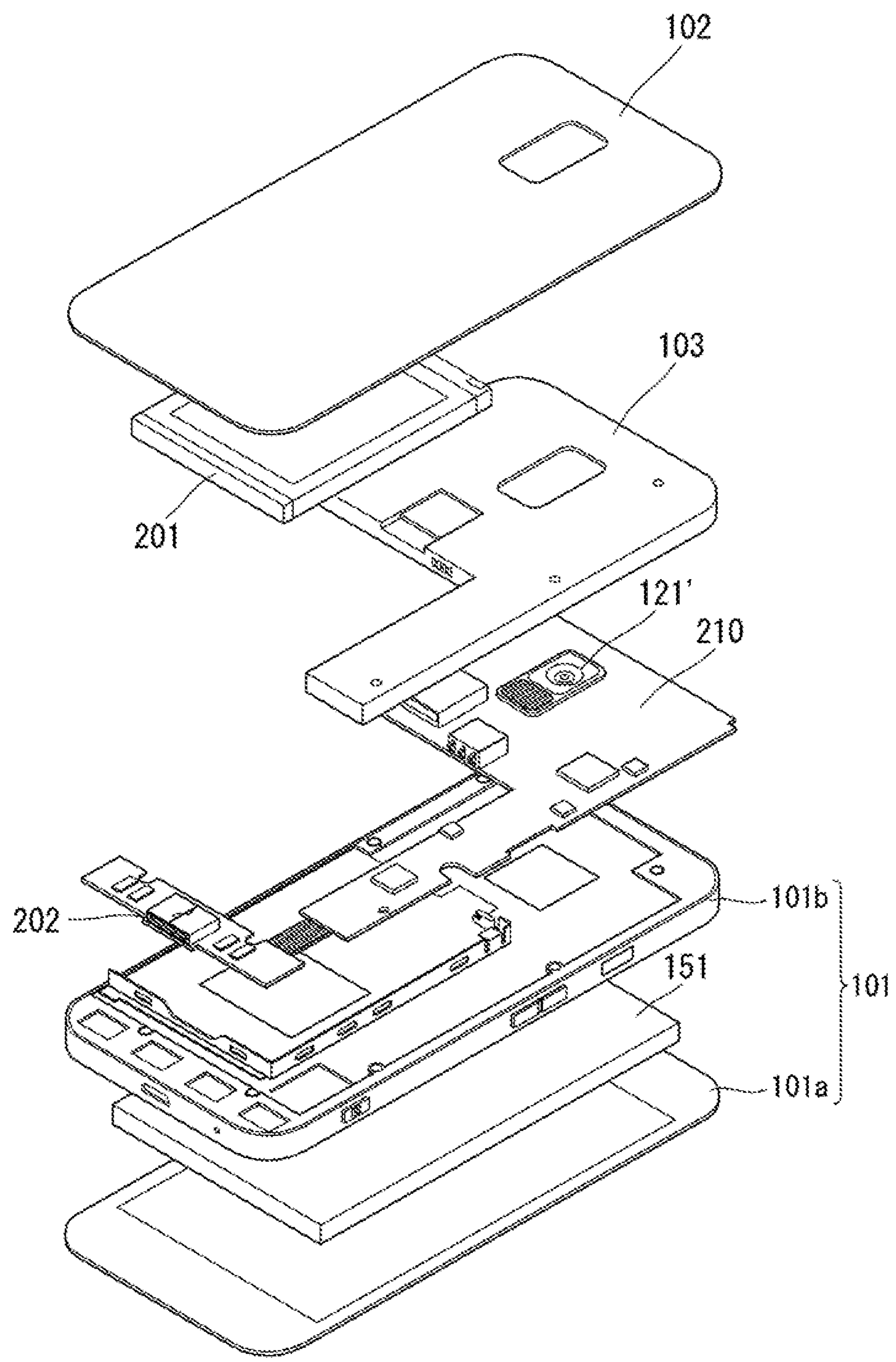

【FIGURE 5】
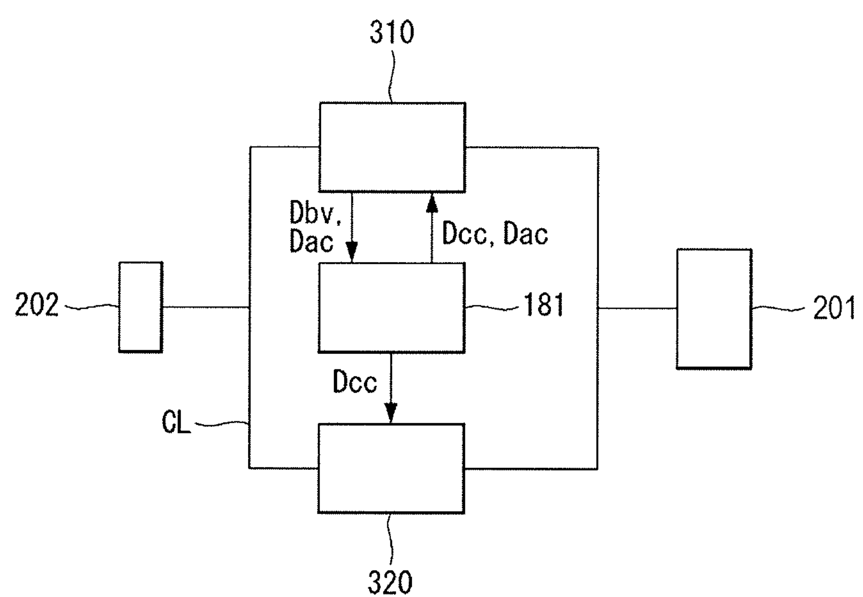

【FIGURE 6】
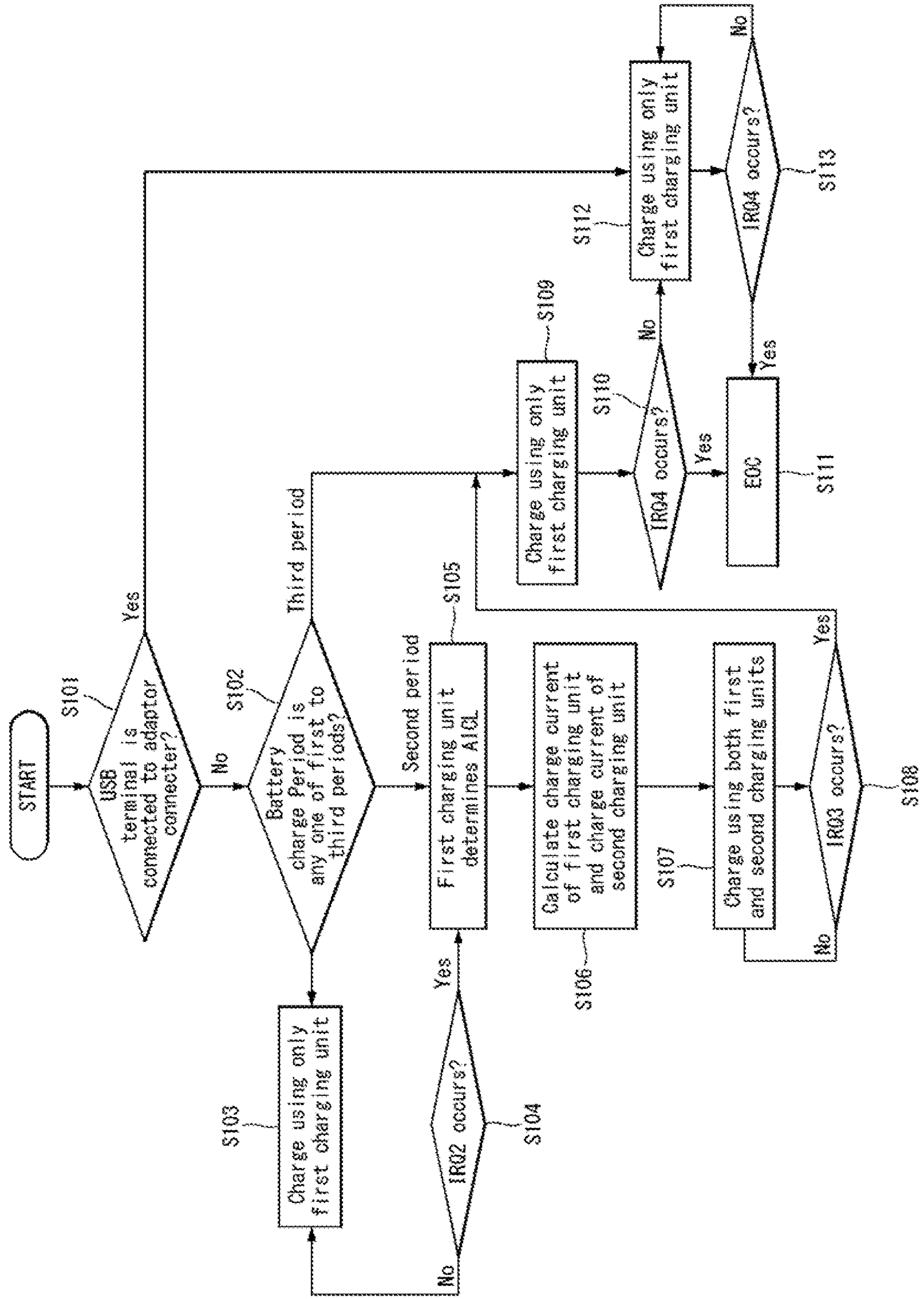

【FIGURE 7A】
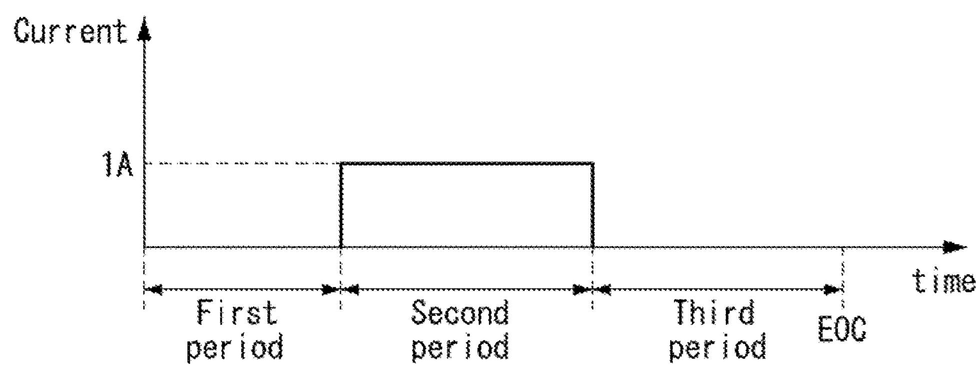
【FIGURE 7B】
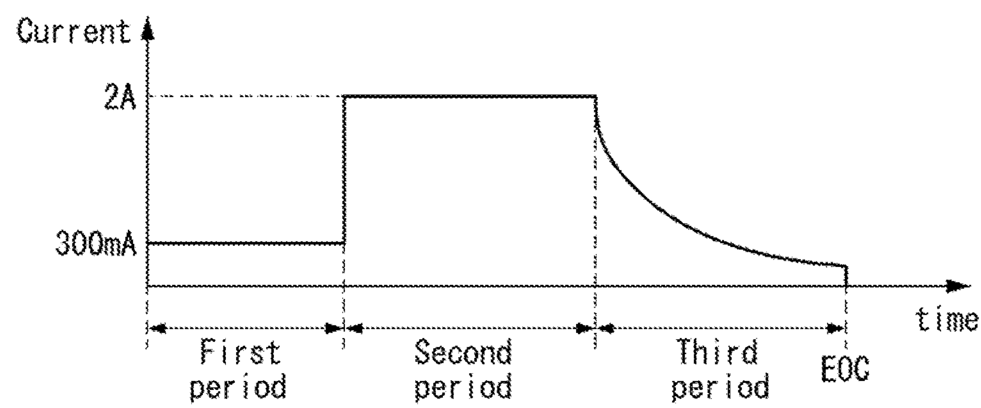

【FIGURE 8】
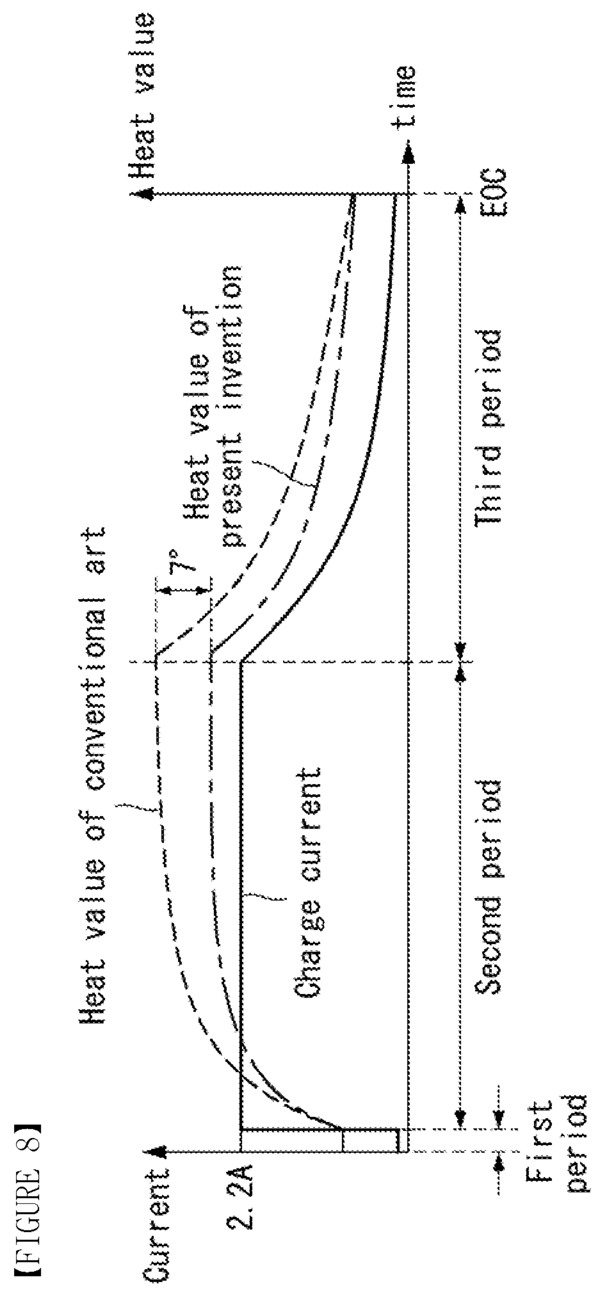

MOBILE TERMINAL AND BATTERY CHARGING METHOD THEREFOR

CROSS REFERENCE TO RELATED APPLICATIONS

This application is the National Phase of PCT International Application No. PCT/KR2014/002110, filed on Mar. 13, 2014, which claims priority under 35 U.S.C. 119(a) to Patent Application No. 10-2013-0110914, filed in the Republic of Korea on Sep. 16, 2013, all of which are hereby expressly incorporated by reference into the present application.

BACKGROUND OF THE INVENTION

Field of the Invention

The present invention relates to a mobile terminal and a battery charging method therefor.

Description of the Related Art

With diversification of a function of a terminal such as a personal computer, a notebook computer, and a mobile phone, the terminal has been implemented into a multimedia player having a complex function, for example, photographing of a picture or a moving picture, reproduction of a music file or a moving picture file, game playing, and reception of broadcasting. The terminals may be classified into a mobile terminal and a stationary terminal according to whether or not mobility.

The mobile terminal is used while a user carries. Because the mobile terminal is used while the user moves, it is difficult for the mobile terminal to receive separate power supply from the outside. That is, the mobile terminal uses an embedded battery as a power supply source. Therefore, in order to use the mobile terminal for a long time without separate power supply from the outside, it is necessary to increase a battery capacity.

However, when a large volume of battery is used in the mobile terminal, there is a problem that a battery charge time increases. In order to shorten a battery charge time, a charge current for charging a battery may be increased, but in this case, there is a problem that a heat value of a charging unit that supplies a charge current largely increases for a charge period. In order to reduce a heat value of the charging unit, a thermal diffusion sheet may be attached to the charging unit, but because there is a limitation in reducing a heat value using the thermal diffusion sheet, a more substantial measure is requested.

SUMMARY OF THE INVENTION

The present invention has been made in view of the above problems, and provides a mobile terminal and a battery charging method therefor that can minimize a heat value of a plurality of charging units for a charge time while reducing a charge time of the battery.

In accordance with an aspect of the present invention, a mobile terminal includes: a terminal body including a battery; an adaptor connecter formed at one side surface of the terminal body and to which a power supply adaptor is connected; a plurality of charging units configured to charge the battery between the adaptor connecter and the battery; and a controller configured to generate a control signal for controlling each of the plurality of charging units.

In accordance with another aspect of the present invention, a mobile terminal charging method including a terminal body including a battery; an adaptor connecter formed at one side surface of the terminal body and to which a power supply adaptor is connected; and a plurality of charging units that charge the battery between the adaptor connecter and the battery includes: charging the battery using the entire of the plurality of charging units for a predetermined period of a charge period that charges the battery with a connection of the power supply adaptor to the adaptor connecter; and charging the battery using any one of the plurality of charging units for the remaining period, except for the predetermined period of the charge period.

Advantages

According to the present invention, a battery is charged using a plurality of charging units only for a predetermined period of a charge period. Therefore, in the present invention, a battery is charged using a plurality of charging units for a predetermined period and using one charging unit for the remaining period and thus while reducing a charge time of the battery, a heat value of a plurality of charging units can be minimized.

BRIEF DESCRIPTION OF THE DRAWINGS

The objects, features and advantages of the present invention will be more apparent from the following detailed description in conjunction with the accompanying drawings, in which:

FIG. 1 is a block diagram illustrating a configuration of a mobile terminal according to an exemplary embodiment of the present invention.

FIG. 2 is a perspective view illustrating a front surface of a mobile terminal according to an exemplary embodiment of the present invention.

FIG. 3 is a perspective view illustrating a rear surface of a mobile terminal according to an exemplary embodiment of the present invention.

FIG. 4 is an exploded perspective view illustrating a mobile terminal according to an exemplary embodiment of the present invention.

FIG. 5 is a block diagram illustrating a controller, a plurality of charging units, a battery, and an adaptor coupler according to an exemplary embodiment of the present invention.

FIG. 6 is a flowchart illustrating a mobile terminal charging method according to an exemplary embodiment of the present invention.

FIG. 7A is a graph illustrating a charge current of a first charging unit.

FIG. 7B is a graph illustrating a charge current of a second charging unit.

FIG. 8 is a graph illustrating a heat value of the conventional art and a heat value of the present invention.

DETAILED DESCRIPTION OF EXEMPLARY EMBODIMENTS

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

The mobile terminal may include a cellular phone, a smart phone, a laptop computer, a digital broadcasting terminal, personal digital assistants (PDA), a portable multimedia player (PMP), a navigation system and/or so on.

FIG. 1 is a block diagram of a mobile terminal according to an embodiment. Other embodiments, configurations and arrangements may also be provided. As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply unit 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or ZigBee® may be used as a short range communication technique.

The location information module 115 may confirm or obtain a location or a position of the mobile terminal 100. A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time. A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display module 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply unit 190 supplies power and/or whether the interface 170 is connected to an external device. The sensing unit 140 may also include a posture detection sensor 141 and a proximity sensor 142. The sensing unit 140 may sense a motion of the mobile terminal 100.

The output unit 150 may generate visual, auditory and/or tactile output, and the output unit 150 may include a display module 151, an audio output module 152, an alarm 153, and a haptic module 154. The display module 151 may display information processed by the mobile terminal 100. The display module 151 may display a user interface (UI) and/or a graphic user interface (GUI) related to a telephone call when the mobile terminal 100 is in the call mode. The display module 151 may also display a captured and/or received image, a UI or a GUI when the mobile terminal 100 is in the video telephony mode or the photographing mode.

The display module 151 may include at least one of a liquid crystal display, a thin film transistor liquid crystal display, an organic light-emitting diode display, a flexible display and/or a three-dimensional display. The display module 151 may be of a transparent type or a light transmissive type. That is, the display module 151 may include a transparent display.

The transparent display may be a transparent liquid crystal display. A rear structure of the display module 151 may also be of a light transmissive type. Accordingly, a user may see an object located behind the body (of the mobile terminal 100) through the transparent area of the body of the mobile terminal 100 that is occupied by the display module 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display module 151 and a sensor sensing touch (hereafter referred to as a touch sensor) form a layered structure that is referred to as a touch screen, the display module 151 may be used as an input device in addition to an output device.

The touch sensor may convert a variation in pressure applied to a specific portion of the display module 151 or a variation in capacitance generated at a specific portion of the display module 151 into an electric input signal. The touch sensor may sense pressure of touch as well as position and area of the touch. When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor (of the sensing unit 140) may be located in an internal region of the mobile terminal 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display module 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identity module (UIM), a subscriber identity module (SIM) and/or a universal subscriber identity module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images.

The power supply unit 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

FIG. 2 is a perspective view illustrating a front surface of a mobile terminal according to an exemplary embodiment of the present invention. FIG. 3 is a perspective view illustrating a rear surface of a mobile terminal according to an exemplary embodiment of the present invention. FIG. 4 is an exploded perspective view illustrating a mobile terminal according to an exemplary embodiment of the present invention.

Referring to FIGS. 2 to 4, the mobile terminal 100 according to an exemplary embodiment of the present invention is formed in a structure including a bar type body. However, embodiments are not limited to a bar type terminal and may be applied to terminals of various types including slide type, folder type, swing type and/or swivel type terminals having at least two bodies that are relatively movably combined.

The body includes a case (casing, housing, and cover) forming an external appearance. In the present exemplary embodiment, the cases may be classified into a front case 101, a rear case 102, and a middle case 103. The cases may be made of plastics through injection molding or made of a metal material such as stainless steel (STS) or titanium (Ti).

The display module 151, the audio output unit 152, the camera 121, the use input unit 130/131 and 132, the microphone 122 and the interface 170 may be arranged (or provided) in the terminal body, and more specifically may be arranged (or provided) in the front case 101. The display module 151 may be disposed between a first front case 101*a* and a second front case 101*b*, as shown in FIG. 4. In an area adjacent to one end portion of both end portions of the display module 151, the audio output module 151 and the camera 121 are disposed, and in an area adjacent to the other end portion, a first operating unit 131 and the microphone 122 are disposed. A second operating unit 132 and the interface 170 may be disposed at side surfaces of the front case 101.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display module 151 to a touch recognition mode.

At least one circuit board(s) 210 and a battery 201 may be disposed between the front case 101 and the middle case 103. The circuit board(s) 210 may be implemented into a printed circuit board or a flexible printed circuit. In the circuit board(s) 210, several kinds of electronic components as well as a plurality of control circuits may be mounted.

For example, in the circuit board(s) 210, a second camera 121', an adaptor connecter 202, a plurality of charging units, a power management integrated circuit (IC), and a charge controller may be mounted. The second camera 121' has a photographing direction substantially opposite to that of the first camera 121 and may be a camera having a pixel different from that of the camera 121. For example, the first camera 121 has a low pixel that can photograph a user face and that can transmit the photographed user face to another party when performing audiovisual communication, and there are many cases in which the second camera 121' photographs a general subject and does not immediately transmit the photographed subject and thus it is preferable that the second camera 121' has a high pixel. The first and second cameras 121 and 121' may be installed in a terminal body for rotation or pop-up. Further, a flash and a mirror may be additionally disposed adjacent to the second camera 121'. The second camera 121' may be exposed at a rear surface of the rear case 102 through a hole of the rear case 102 and the middle case 103. The adaptor connecter 202 may be exposed to a side surface of a lower portion of the front case 101 and may be connected to a power supply adaptor. A detailed description of a plurality of charging units and the charge controller will be described later with reference to FIG. 5.

The mobile terminal 100 has the wireless communication unit 110 for broadcasting reception, voice/data transmission and reception, and GPS information transmission and reception and has an antenna to guarantee a wireless communication performance. At a side surface of the rear case 103, in addition to an antenna for communication, an antenna for broadcasting signal reception may be additionally disposed. An antenna forming a portion of the broadcasting receiving module (111 of FIG. 1) may be installed to take out from a terminal body.

FIG. 5 is a block diagram illustrating a charge controller, a plurality of charging units, a battery, and an adaptor coupler according to an exemplary embodiment of the present invention.

Referring to FIG. 5, a charge controller 181 and a plurality of charging units are mounted in the circuit board 210. In FIG. 5, a plurality of charging units include two charging units, i.e., a first charging unit 310 and a second charging unit 320, but the present invention is not limited thereto. The plurality of charging units may include the n (n is a natural number of 2 or more) number of charging units.

The first charging unit 310 and the second charging unit 320 are connected in parallel between the battery 201 and the adaptor connecter 202. Thereby, a conductive line (CL) connected to the adaptor connecter 202 is branched from any one point between the adaptor connecter 202 and the charging units 310 and 320. Any one of branched CLs is connected to the first charging unit 310, and the other one thereof is connected to the second charging unit 320. Further, a CL connected to the battery 201 is branched from any one point between the battery 201 and the charging units 310 and 320. Any one of branched CLs is connected to the first charging unit 310, and the other one thereof is connected to the second charging unit 320.

The first and second charging units 310 and 320 receive power from a power supply adaptor connected to the adaptor connecter 202 to charge the battery 201. Further, when the power supply adaptor is not connected to the adaptor connecter 202, the first and second charging units 310 and 320 supply power from the charged battery 201 to a system.

When the power supply adaptor is connected to the adaptor connecter 202, the first and second charging units 310 and 320 receive power from the power supply adaptor. In this case, the first and second charging units 310 and 320 supply a current for charging the battery 201 according to the control of the charge controller 181. The first and second charging units 310 and 320 supply a current to the battery 201 according to first and second charge current data Dcc, respectively.

Further, the first charging unit 310 detects a voltage of the battery 201 and compares the voltage of the battery 201 with first to third threshold voltages. The first charging unit 310 outputs battery voltage data Dbv to the charge controller 181 according to the detected voltage of the battery 201. For example, when the voltage of the battery 201 is lower than a first threshold voltage, the first charging unit 310 may output battery voltage data Dbv having a first value, when the voltage of the battery 201 is equal to or larger than a first threshold voltage and is lower than a second threshold voltage, the first charging unit 310 may output battery voltage data Dbv having a second value, when the voltage of the battery 201 is equal to or larger than a second threshold voltage and is lower than a third threshold voltage, the first charging unit 310 may output battery voltage data Dbv having a third value, and when the voltage of the battery 201 is equal to or larger than a third threshold voltage, the first charging unit 310 may output battery voltage data Dbv having a fourth value.

Further, in order to determine a power supply ability of a power supply adaptor connected to the adaptor connecter 202, the first charging unit 310 determines an auto input current limit (AICL). For this reason, the first charging unit 310 detects a maximum value of a current that can receive from the power supply adaptor connected to the adaptor connecter 202 and outputs adaptor current data Dac corresponding to the maximum value to the charge controller 181.

The charge controller 181 may determine a level of a detected voltage of the battery 201 according to battery voltage data Dbv. The charge controller 181 controls operation of the first charging unit 310 and the second charging unit 320 according to the detected voltage of the battery 201. For example, the charge controller 181 generates an interrupt signal according to the battery voltage data Dbv, thereby controlling operation of the first charging unit 310 and the second charging unit 320.

Further, the charge controller 181 calculates a current value to be supplied to the first and second charging units 310 and 320 according to the adaptor current data Dac and supplies first and second charge current data Dcc corresponding to the current value to the first and second charging units 310 and 320, respectively.

Further, the charge controller 181 determines whether the power supply adaptor connected to the adaptor connecter 202 is a travel adapter (TA) or a USB terminal. The TA includes only a power supply line, but the USB terminal includes a data transmission line as well as a power supply line. Therefore, when the USB terminal is connected to the adaptor connecter 202, data transmission as well as power supply occurs. Therefore, when data transmission as well as power supply occurs, the charge controller 181 may determine that the USB terminal is connected to the adaptor connecter 202. When the TA is connected to the adaptor connecter 202 and when the USB terminal is connected to the adaptor connecter 202, the charge controller 181 differently controls the first and second charging units 310 and 320. A detailed description of operation of the charge controller 181 and the first and second charging units 310 and 320 will be described later with reference to FIG. 7.

FIG. 6 is a flowchart illustrating a mobile terminal charging method according to an exemplary embodiment of the present invention. FIGS. 7A and 7B are graphs illustrating a charge current of a first charging unit and a second charging unit. In an exemplary embodiment of the present invention, a battery is charged using a plurality of charging units for a predetermined period of a charge period.

Hereinafter, a mobile terminal charging method according to an exemplary embodiment of the present invention will be described in detail with reference to FIGS. 6, 7A, and 7B. Because the mobile terminal according to an exemplary embodiment of the present invention includes a plurality of charging units, the mobile terminal charges the battery 201 using a plurality of charge paths. Therefore, in the present invention, even when a large volume of battery is used, a charge period can be reduced. In an exemplary embodiment of the present invention, it is described that a plurality of charging units include the first charging unit 310 and the second charging unit 320, but the present invention is not limited thereto. That is, a plurality of charging units according to an exemplary embodiment of the present invention may include then (n is a natural number of 2 or more) number of charging units. In this case, in the following exemplary embodiment, the second charging unit 320 may be the remaining charging units, except for the first charging unit 310.

First, the charge controller 181 determines whether the power supply adaptor connected to the adaptor connecter 202 is a TA or a USB terminal. If the power supply adaptor connected to the adaptor connecter 202 is a TA, the charge controller 181 controls battery charge according to a voltage level of the battery 201.

Specifically, a battery charge period of the mobile terminal may be divided into first to third periods according to a voltage level of the battery 201. The first period is a period in which a voltage of the battery 201 is lower than a first threshold voltage and is a trickle charge period that charges the battery 201 with a low current in order to prevent the battery 201 from being overloaded. The second period is a period in which a voltage of the battery 201 is equal to or larger than a first threshold voltage, is lower than a second threshold voltage, and is a constant current period that charges the battery 201 with a high current for high speed charge. The third period is a period in which a voltage of the battery 201 is equal to or larger than a second threshold voltage, is lower than a third threshold voltage, and is a constant voltage charge period that charges the battery 201 while slowly lowering a current supplied to the battery 201 in order to prevent the battery 201 from being overloaded. The fourth period is a period in which a voltage of the battery 201 is equal to or larger than a third threshold voltage, is a period in which the battery 201 is completely charged, and is a recharging period that charges the battery 201 in order to maintain an end of charging (EOC) state of the battery 201.

When a voltage of the battery 201 is lower than a first threshold voltage, the first charging unit 310 outputs battery voltage data Dbv having a first value, and when a voltage of the battery 201 is equal to or larger than a first threshold voltage and is lower than a second threshold voltage, the first charging unit 310 outputs battery voltage data Dbv having a second value. Further, when a voltage of the battery 201 is equal to or larger than a second threshold voltage and is lower than a third threshold voltage, the first charging unit 310 outputs battery voltage data Dbv having a third value, and when a voltage of the battery 201 is equal to or larger than a third threshold voltage, the first charging unit 310 outputs battery voltage data Dbv having a fourth value.

Thereby, the charge controller 181 may determine whether the battery charge period is any one of first to third periods according to the battery voltage data Dbv and control the first and second charging units 310 and 320. For example, when battery voltage data Dbv having a first value is input, the charge controller 181 determines the battery charge period to the first period and controls the first and second charging units 310 and 320. When battery voltage data Dbv having a second value is input, the charge controller 181 determines the battery charge period to the second period and controls the first and second charging units 310 and 320. When battery voltage data Dbv having a third value is input, the charge controller 181 determines the battery charge period to the third period and controls the first and second charging units 310 and 320 (S101, S102).

Second, operation of the charge controller 181 and the first and second charging units 310 and 320 for the first period will be described in detail with reference to steps S103 and S104.

When a voltage of the battery 201 is lower than a first threshold voltage, the first charging unit 310 outputs battery voltage data Dbv having a first value to the charge controller 181. When the battery voltage data Dbv having a first value is input, the charge controller 181 determines the battery charge period to the first period corresponding to a trickle charge period and controls the first and second charging units 310 and 320. Because the trickle charge period is a period that charges the battery 201 with a low current in order to prevent the battery 201 from being overloaded, the charge controller 181 controls to activate the first charging unit 310 and to deactivate the second charging unit 320 for the first period.

In this case, the charge controller 181 outputs a first interrupt signal IRQ1 that instructs trickle charge to the first and second charging units 310 and 320. Further, the charge controller 181 outputs first charge current data Dcc1 including information of a current level of the first charging unit 310 to the first charging unit 310 for the first period.

The second charging unit 320 is deactivated in response to the first interrupt signal IRQ1, as shown in FIG. 7B. The first charging unit 310 charges the battery 201 with a first current according to the first interrupt signal IRQ1 and the first charge current data Dcc1, as shown in FIG. 7A. For example, the first current may be 300 mA, as shown in FIG. 7A and may be a low current of 500 mA. When a voltage of the battery 201 is lower than a first threshold voltage, the reason of performing trickle charge with a low current of 500 mA is to prevent the battery 201 from being overloaded (S103).

When a voltage of the battery 201 is equal to or larger than a first threshold voltage with charge, the first charging unit 310 outputs battery voltage data Dbv having a second value to the charge controller 181. When battery voltage data Dbv having a second value is input, the charge controller 181 determines the battery charge period to the second period corresponding to a DC charge period and controls the first and second charging units 310 and 320. Because the DC charge period is a period that charges the battery 201 with a high current for highspeed charge, the charge controller 181 controls to activate the second charging unit 320 and to charge the battery 201 using a plurality of charge paths for the second period.

In this case, the charge controller 181 outputs a second interrupt signal IRQ2 that instructs DC charge to the first and second charging units 310 and 320. The second charging unit 320 is activated in response to the second interrupt signal IRQ2, as shown in FIG. 7B. Therefore, in the present invention, because charge is performed using the first and second charging units 310 and 320 for the second period, a charge velocity can be enhanced (S104).

Third, the charge controller 181 and the first and second charging units 310 and 320 for the second period will be described in detail with reference to steps S105 to S108.

First, it is necessary to determine a power supply ability of the power supply adaptor connected to the adaptor connecter 202 for high speed charge of the battery 201 for the second period. Therefore, the first charging unit 310 determines an auto input current limit (AICL). Specifically, the first charging unit 310 detects a maximum value of a current that can receive from the power supply adaptor connected to the adaptor connecter 202 and outputs adaptor current data Dac corresponding to the maximum value to the charge controller 181 (S105).

The charge controller 181 calculates a charge current of the first charging unit 310 and a charge current of the second charging unit 320 within a maximum value of a current of adapter current data DAC supplied from the power supply adaptor. The charge controller 181 may calculate a charge current of the first charging unit 310 and a charge current of the second charging unit 320 in consideration of resistance of a predetermined conductive line. The charge controller 181 outputs a calculated charge current of the first charging unit 310 as first charge current data Dcc1 to the first charging unit 310 and outputs a calculated charge current of the second charging unit 320 as second charge current data Dcc2 to the second charging unit 320. The first charging unit 310 supplies a current to the battery 201 according to the first charge current data Dcc1, and the second charging unit 320 supplies a current to the battery 201 according to the second charge current data Dcc2. As shown in FIGS. 7A and 7B, the first charging unit 310 may supply a current of 2 A, and the second charging unit 320 may supply a current of 1 A. A current that charges the battery 201 is a second current, which is the sum of a charge current of the first charging unit 310 and a charge current of the second charging unit 320. Finally, in the present invention, because the battery may be charged using both the first and second charging units 310 and 320 and a high current for the second period, a charge time of the battery can be reduced (S106, S107).

When a voltage of the battery 201 is equal to or larger than a second threshold voltage with charge, the first charging unit 310 outputs battery voltage data Dbv having a third value to the charge controller 181. When the battery voltage data Dbv having a third value is input, in order to prevent the battery 201 from being overcharged, the charge controller 181 determines the battery charge period to the third period corresponding to a period that charges the battery 201 while slowly lowering a current supplied to the battery 201 and controls the first and second charging units 310 and 320. Therefore, because it is unnecessary that the second charging unit 320 is activated for the third period, the charge controller 181 controls to activate the first charging unit 310 and to deactivate the second charging unit 320 for the third period.

In this case, the charge controller 181 outputs a third interrupt signal IRQ3 that instructs a constant voltage charge period for preventing the battery 201 from being overcharged to the first and second charging units 310 and 320. Further, the charge controller 181 outputs first charge current data Dcc1 including information of a current level of the first charging unit 310 to the first charging unit 310 for the third period.

The second charging unit 320 is deactivated in response to the third interrupt signal IRQ3, as shown in FIG. 7B. The first charging unit 310 charges the battery 201 while slowly lowering a current supplied to the battery 201 according to the third interrupt signal IRQ3 and the first charge current data Dcc1 (S108), as shown in FIG. 7A.

Fourth, the charge controller 181 and the first and second charging units 310 and 320 for the third period will be described in detail with reference to steps S109 to S111.

First, in order to prevent the battery 201 from being overcharged for the third period, while slowly lowering a current supplied to the battery 201, the battery 201 is charged. Therefore, because it is unnecessary that the second charging unit 320 is activated for the third period, the charge controller 181 controls to deactivate the second charging unit 320.

The second charging unit 320 is deactivated in response to the third interrupt signal IRQ3, as shown in FIG. 7B. The first charging unit 310 charges the battery 201 while slowly lowering a current supplied to the battery 201 according to the third interrupt signal IRQ3 and first charge current data Dcc1, as shown in FIG. 7A. Specifically, the charge controller 181 receives an input of data corresponding to a voltage of the battery 201 from the first charging unit 310. As shown in FIG. 7A, when a voltage of the battery 201 increases, the charge controller 181 controls a current of the first charging unit 310 to lower. That is, the charge controller 181 controls a current of the first charging unit 310 to be inversely proportional to a voltage of the battery 201 for the third period (S109).

When a voltage of the battery 201 is equal to or larger than a third threshold voltage with charge, the first charging unit 310 outputs battery voltage data Dbv having a fourth value to the charge controller 181. When the battery voltage data Dbv having a fourth value is input, the charge controller 181 determines that the battery 201 is in an end of charging (EOC) state. In this case, in order to maintain an EOC state of the battery 201, the charge controller 181 determines the battery charge period to the fourth period corresponding to a recharging period, which is a charge period and controls the first and second charging units 310 and 320. Therefore, because it is unnecessary that the second charging unit 320 is activated for the fourth period, the charge controller 181 controls to activate the first charging unit 310 and to deactivate the second charging unit 320. Further, the charge controller 181 controls the first charging unit 310 to supply a predetermined current to the battery 201 for the fourth period.

In this case, the charge controller 181 outputs a fourth interrupt signal IRQ4 that instructs a recharging period to the first and second charging units 310 and 320. Further, the charge controller 181 outputs first charge current data Dcc1 including information of a current level of the first charging unit 310 to the first charging unit 310 for the fourth period.

The second charging unit 320 is deactivated in response to the fourth interrupt signal IRQ3. The first charging unit 310 supplies a predetermined current necessary for maintaining an EOC state of the battery 201 to the battery 201 according to the fourth interrupt signal IRQ4 and first charge current data Dcc1 (S110, S111).

Fifth, when the power supply adaptor connected to the adaptor connecter 202 is a USB terminal, the charge controller 181 and the first and second charging units 310 and 320 will be described in detail with reference to steps S112 and S113.

If the USB terminal is connected to the adaptor connecter 202 through a USB cable, the charge controller 181 controls to charge the battery 201 using only the first charging unit 310. This is because when the USB terminal is connected to the adaptor connecter 202, the adaptor connecter 202 receives a current lower than when the TA is connected to the adaptor connecter 202 and thus it is unnecessary to use a plurality of charging units. Therefore, the charge controller 181 controls to charge the battery 201 using only the first charging unit 310 regardless of battery voltage data Dbv.

In this case, the charge controller 181 outputs a fifth interrupt signal IRQ5 that instructs to connect the USB terminal to the adaptor connecter 202 to the first and second charging units 310 and 320. The second charging unit 320 is deactivated in response to the fifth interrupt signal IRQ5. The first charging unit 310 charges the battery 201 using a current received from the USE terminal. For example, when the first charging unit 310 receives a current of 500 mA from the USB cable connected to the adaptor connecter 202, the first charging unit 310 may charge the battery 201 with 500 mA (S112).

When a voltage of the battery 201 is equal to or larger than a third threshold voltage with charge, the first charging unit 310 outputs battery voltage data Dbv having a fourth value to the charge controller 181. When the battery voltage data Dbv having a fourth value is input, the charge controller 181 determines that the battery 201 in an EOC state. In this case, in order to maintain an EOC state of the battery 201, the charge controller 181 determines the battery charge period to the fourth period corresponding to a recharging period, which is a charge period and controls the first and second charging units 310 and 320. Therefore, because it is unnecessary that the second charging unit 320 is activated for the fourth period, the charge controller 181 controls to activate the first charging unit 310 and to deactivate the second charging unit 320. Further, the charge controller 181 controls the first charging unit 310 to supply a predetermined current to the battery 201 for the fourth period.

In this case, the charge controller 181 outputs a fourth interrupt signal IRQ4 that instructs a recharging period to the first and second charging units 310 and 320. Further, the charge controller 181 outputs first charge current data Dcc1 including information of a current level of the first charging unit 310 to the first charging unit 310 for the fourth period.

The second charging unit 320 is deactivated in response to the fourth interrupt signal IRQ3. The first charging unit 310 supplies a predetermined current necessary for maintaining an EOC state of the battery 201 to the battery 201 according to the fourth interrupt signal IRQ4 and first charge current data Dcc1 (S113).

As described above, in the present invention, a battery is charged using a plurality of charging units only for a predetermined period of a charge period. The predetermined period is a second period corresponding to a DC charge period. Therefore, in the present invention, a battery is charged using a plurality of charging units for a predetermined period and using one charging unit for the remaining period and thus while a charge time of the battery is reduced, a heat value of a plurality of charging units can be minimized.

FIG. 8 is a graph illustrating a heat value of the conventional art and a heat value of the present invention.

Referring to FIG. 8, the conventional art relates to technology that charges a battery using one charging unit, but the present invention relates to technology that charges a battery using a plurality of charging units only for a predetermined period of a charge period. In both the conventional art and the present invention, a current for charging the battery is substantially the same. For example, in both the conventional art and the present invention, during a second period corresponding to a DC charge period, a current for charging the battery is 2.2 A.

As shown in FIG. 8, the conventional art has a much larger heat value, compared with the present invention during a second period corresponding to a DC charge period. The conventional art has a temperature higher by approximately 7°, compared with the present invention during the second period. Because a temperature that can enhance using a thermal diffusion sheet is merely approximately 2-3°, an effect that can reduce a heat value using the present invention is very excellent.

As described above, in the present invention, a battery is charged using a plurality of charging units only for a predetermined period of a charge period. Therefore, in the present invention, a battery is charged using a plurality of charging units for a predetermined period and using one charging unit for the remaining period and thus while reducing a charge time of the battery, a heat value of a plurality of charging units can be minimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention can be used in an industry related to a mobile terminal.

What is claimed is:

1. A mobile terminal, comprising:

a terminal body comprising a battery;

an adaptor connecter formed at one side surface of the terminal body and to which a power supply adaptor is connected;

a plurality of charging units configured to charge the battery between the adaptor connecter and the battery; and a controller configured to generate a control signal for controlling each of the plurality of charging units, wherein the power supply adaptor is connected to the adaptor connecter to charge the battery using the entire of the plurality of charging units for a predetermined period of a charge period that charges the battery and to charge the battery using any one of the plurality of charging units for the remaining period, except for the predetermined period of the charge period.

2. The mobile terminal of claim 1, wherein the plurality of charging units are connected in parallel between the adaptor connecter and the battery.

3. The mobile terminal of claim 1, wherein the charge period comprises:

a first period that charges the battery with a first current using any one of the plurality of charging units, when a voltage of the battery is lower than a first threshold voltage;

a second period that charges the battery with a second current higher than the first current using the entire of the plurality of charging units, when the voltage of the battery is equal to or larger than the first threshold voltage and is lower than a second threshold voltage; and a third period that charges the battery while slowly lowering the second current using any one of the plurality of charging units, when the voltage of the battery is equal to or larger than the second threshold voltage and is lower than a third threshold voltage.

4. The mobile terminal of claim 3, wherein a current supplied to the battery for the third period is inversely proportional to the voltage of the battery.

5. The mobile terminal of claim 4, wherein the controller is configured to generate a first interrupt signal for the first period and the third period to deactivate the remaining charging units and to generate a second interrupt signal for the second period to activate the remaining charging units.

6. A mobile terminal charging method comprising a terminal body comprising a battery; an adaptor connecter formed at one side surface of the terminal body and to which a power supply adaptor is connected; and a plurality of charging units that charge the battery between the adaptor connecter and the battery, the method comprising:

charging the battery using the entire of the plurality of charging units for a predetermined period of a charge period that charges the battery with a connection of the power supply adaptor to the adaptor connecter; and charging the battery using any one of the plurality of charging units for the remaining period, except for the predetermined period of the charge period.

7. The method of claim 6, wherein the charging of the battery using any one of the plurality of charging units comprises charging the battery with a first current using any one of the plurality of charging units, when a voltage of the battery is lower than a first threshold voltage.

8. The method of claim 7, wherein the charging of the battery using the entire of the plurality of charging units comprises charging the battery with a second current higher than the first current using the entire of the plurality of charging units, when the voltage of the battery is equal to or larger than the first threshold voltage and is lower than a second threshold voltage.

9. The method of claim 8, wherein the charging of the battery using any one of the plurality of charging units comprises charging the battery while slowly lowering the second current using any one of the plurality of charging units, when the voltage of the battery is equal to or larger than the second threshold voltage and is lower than a third threshold voltage.

10. The method of claim 9, wherein a current supplied to the battery is inversely proportional to the voltage of the battery, when the voltage of the battery is equal to or larger than the second threshold voltage and is lower than a third threshold voltage.

* * * * *